(12) United States Patent  (10) Patent No.: US 9,118,093 B2
Boettcher et al.  (45) Date of Patent: Aug. 25, 2015

(54) COOLING JACKET FOR BATTERY PACK

(71) Applicant: Caterpillar Inc., Peoria, IL (US)

(72) Inventors: Matthew R. Boettcher, East Peoria, IL (US); Corey A. Kauk, Peoria, IL (US); Kevin L. Martin, Washburn, IL (US)

(73) Assignee: Caterpillar Inc., Peoria, IL (US)

( * ) Notice: Subject to any disclaimer, the term of this patent is extended or adjusted under 35 U.S.C. 154(b) by 150 days.

(21) Appl. No.: 13/733,262

(22) Filed: Jan. 3, 2013

(65) Prior Publication Data

US 2014/0186675 A1 Jul. 3, 2014

(51) Int. Cl.
*H01M 2/10* (2006.01)
*H01M 10/613* (2014.01)
*H01M 10/625* (2014.01)
*H01M 10/6556* (2014.01)
*H01M 10/6557* (2014.01)

(52) U.S. Cl.
CPC ........ *H01M 10/5004* (2013.01); *H01M 2/1077* (2013.01); *H01M 10/5016* (2013.01); *H01M 10/5057* (2013.01); *H01M 10/5059* (2013.01)

(58) Field of Classification Search
CPC . H01M 6/5038; H01M 2/10; H01M 10/5004; F28F 3/12
USPC .......................................................... 429/99
See application file for complete search history.

(56) References Cited

U.S. PATENT DOCUMENTS

| | | | |
|---|---|---|---|
| 6,498,406 B1 | 12/2002 | Høriuchi et al. | |
| 6,606,245 B2* | 8/2003 | Oda et al. | 361/695 |
| 2005/0170241 A1* | 8/2005 | German et al. | 429/120 |
| 2010/0092849 A1 | 4/2010 | Wood et al. | |
| 2012/0082887 A1 | 4/2012 | Ninomiya et al. | |
| 2012/0107662 A1* | 5/2012 | Rommler et al. | 429/120 |

FOREIGN PATENT DOCUMENTS

| | | | | |
|---|---|---|---|---|
| DE | 102008034874 | | 1/2010 | |
| DE | 102008034874 A1 * | | 1/2010 | H01M 10/50 |
| JP | 4376162 | | 12/2009 | |

* cited by examiner

*Primary Examiner* — Gary Harris
(74) *Attorney, Agent, or Firm* — Jeff A. Greene; Miller, Matthias & Hull LLP

(57) ABSTRACT

A cooling jacket for a battery pack includes a first half and a second half. The first half and the second half are substantially identical and flip-ably connected to each other. A channel is provided in between the first half and the second half. Further, a coolant flows in the channel provided between the first half and the second half.

20 Claims, 5 Drawing Sheets

COOLING JACKET FOR BATTERY PACK

TECHNICAL FIELD

The present disclosure relates generally to a battery pack, and more particularly relates to a cooling jacket for energy storage cells in the battery pack.

BACKGROUND

A machine such as a hydraulic excavator, an articulated truck, a locomotive or an off-site generator may be powered by large battery packs carried onboard. The battery pack includes a housing configured to receive a plurality of energy storage cells. The energy storage cell emits heat during charging and discharging of electrical power, while performing several operations associated with the machine. A cooling arrangement is provided for efficient heat dissipation of the energy storage cells. Typically, an air cooled system is used for heat dissipation of the energy storage cells. The air cooling arrangement may require high space allocation due to increased components and may lead to high costs and increased packaging size. Due to high space allocation and costs, the air cooling arrangement may not be an efficient solution. Further, an additional holding means may be required to hold the energy storage cells.

U.S. Publication Number 2010/0092849 discloses a battery module which includes a housing configured to receive a plurality of cells. The housing includes a first tray that includes a plurality of depressions and a second tray coupled to the first tray that includes a plurality of depressions. Each of the plurality of cells is received within a depression of at least one of the first tray and the second tray. However, there is still room for improvement in the art.

SUMMARY

In an aspect, the present disclosure relates to a cooling jacket for a battery pack. The cooling jacket for a battery pack includes a first half and a second half. The first half and the second half are substantially identical and flip-ably connected to each other. A channel is provided in between the first half and the second half. Further, a coolant flows in the channel provided between the first half and the second half.

In another aspect of the present disclosure, the battery pack includes a first plate provided with an inlet opening to allow the coolant. Further, the battery pack includes a second plate provided with an outlet opening to exit the coolant. The stacked cooling jackets are provided in between the first plate and the second plate. Other features and aspects of this disclosure will be apparent from the following description and the accompanying drawings.

DETAILED DESCRIPTION

Figure 1:
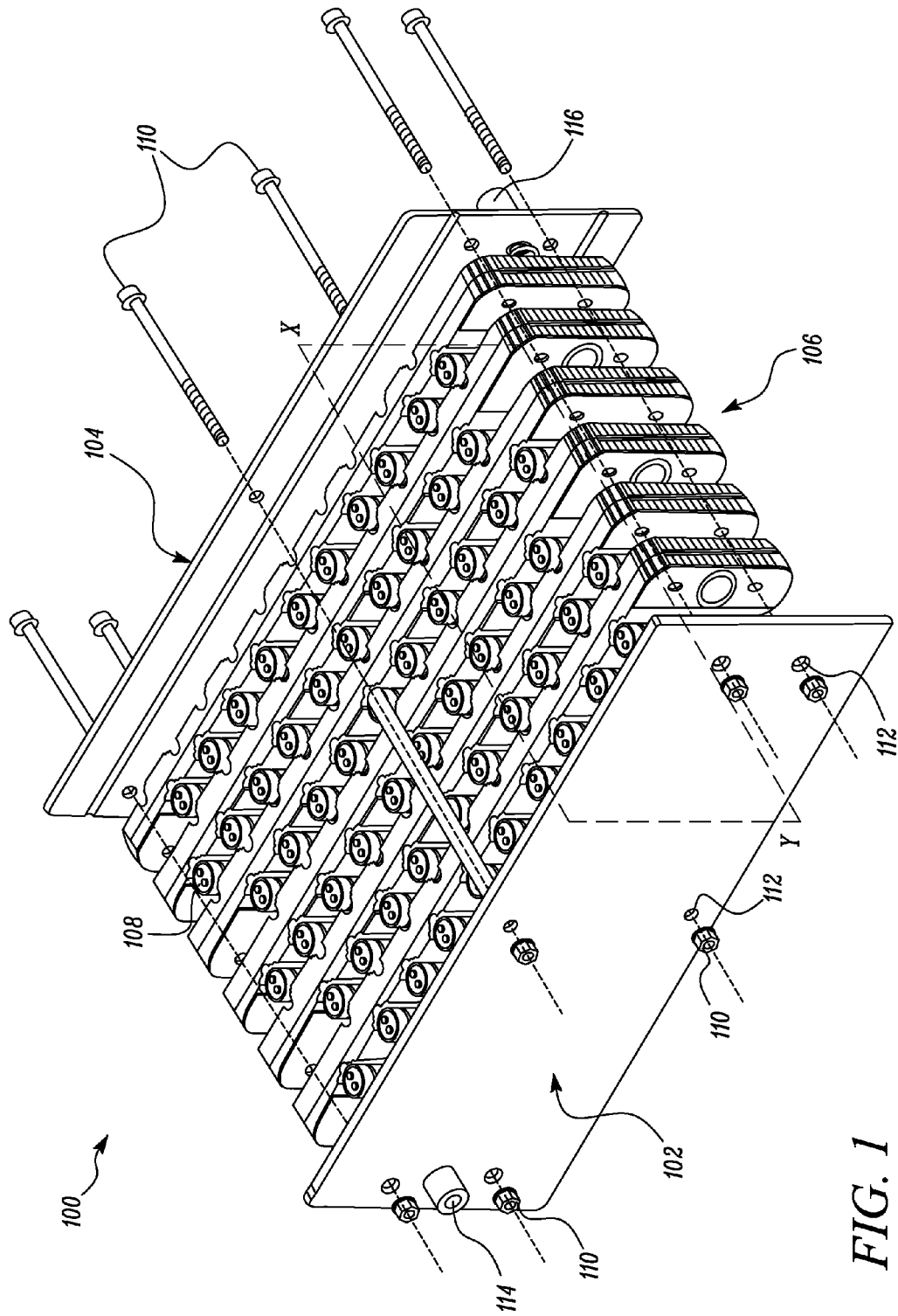
FIG. 1 illustrates an exploded perspective view of a battery pack, according to an aspect of the present disclosure.

FIG. 1 illustrates a perspective exploded view of a battery pack 100, in which various aspects of the present disclosure may be implemented. In an exemplary embodiment, as illustrated in FIG. 1, the battery pack 100 may include a first plate 102 and a second plate 104. A group of stacked cooling jackets 106 are provided in between the first and the second plates 102, 104. Further, the cooling jackets 106 are configured to retain a plurality of energy storage cells 108. The energy storage cells 108 may be for example, but not limited to, ultra-capacitor cells, super capacitors cells, ultra-batteries, electrochemical cells such as, but not limited to, lithium-ion cells, lithium manganese cells, lithium titanate cells, lithium-iron phosphate cells, nickel-cadmium cells, or nickel-metal hydride cells of different sizes. The energy storage cells 108 may be a rechargeable type cell or a disposable type cell. Further, the energy storage cells 108 may be built as jelly rolls which are spiral wound cells in shape. Alternatively, the energy storage cells 108 may be built in any other shape known in the art, for example, polygonal shaped cells. In an aspect of the present disclosure, the energy storage cells 108 may be electric double layer ultra-capacitors having about 1200 F capacity.

In an embodiment of the present disclosure, the first plate 102 and the second plate 104 may be connected by a mechanical fitting 110 to hold the stacked cooling jackets 106. As shown in FIG. 1, the first plate 102 and the second plate 104 may include aligned openings 112 for receiving the mechanical fittings 110, such as, but not limited to, a nut and bolt assembly. The first plate 102, the second plate 104 and the stacked cooling jackets 106 may be made of a suitable material adapted to withstand high temperature and thermal stresses during the charging and discharging of the energy storage cells 108. Further, the battery pack 100 may be further configured to be associated with a plurality of components (not shown) such as, but not limited to, circuit boards, converters, inverters, and controllers. The battery pack 100 and the associated components may be enclosed in a single housing (not shown). A person ordinarily skilled in the art may understand that, the housing may include one or more battery packs based on the power requirements and application.

As illustrated in FIG. 1, the first plate 102 and the second plate 104 may include an inlet opening 114 and an outlet opening 116, respectively. The inlet opening 114 may be configured to allow a liquid coolant to enter into each of the stacked cooling jackets 106 provided between the first plate 102 and the second plate 104. Further, the liquid coolant may exit through the outlet opening 116 provided in the second plate 104. The liquid coolant may flow through the stacked cooling jackets 106 in a serpentine manner, which is explained later in detail.

Figure 2:
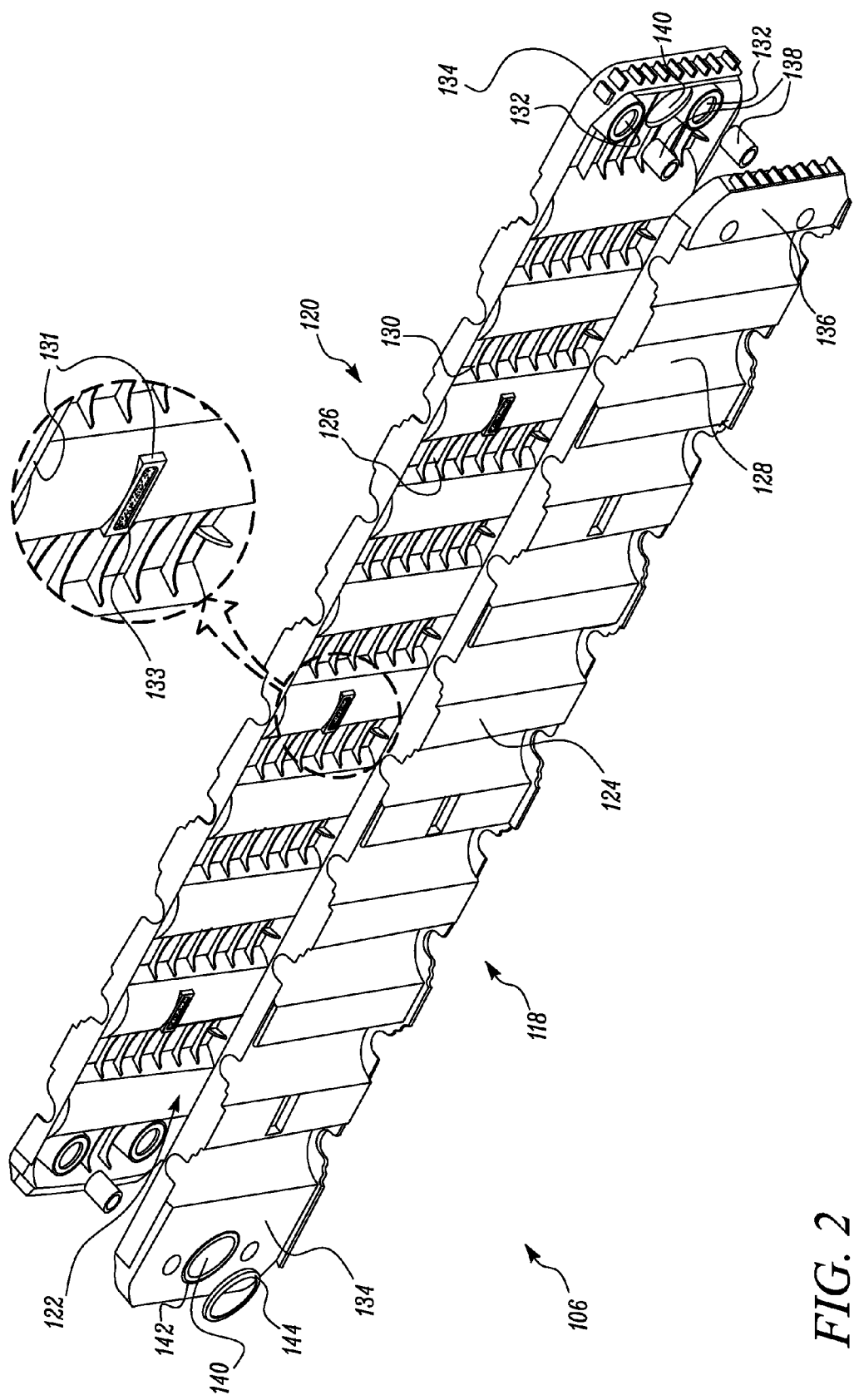
FIG. 2 illustrates an exploded perspective view of a cooling jacket, according to an aspect of the present disclosure.

FIG. 2 illustrates an exploded view of the cooling jacket 106 of the battery pack 100, in an embodiment of the present disclosure. The cooling jacket 106 may include a first half 118, and a second half 120. The first half 118 and the second half 120 may be substantially identical and configured to be flip-ably connected. The first half 118 and the second half 120 are injection molded halves made of plastic, such as, but not limited to, non-filled acrylonitrile butadiene styrene or ABS, polyethylene or polypropylene. In an aspect of the present disclosure, the first half 118 and the second half 118 may be connected to each other by any means, for example, but not limited, to vibration welding. In another aspect of the present disclosure, the first half 118 and the second half 120 may be glued to each other. The connection of the first half 118 with the second half 120 creates a channel 122 in between to allow a flow of the liquid coolant. In an aspect of the present disclosure, the liquid coolant may be for example, but not limited to water, ethyl-glycol, and oil. In an aspect of the present disclosure, the liquid coolant may flow through the channels 122 provided in between the first half 118 and the second half 120 of the cooling jackets 106 in a substantial straight path, thus cooling the energy storage cells 108. Further, the liquid coolant may flow through the stacked cooling jackets 106 in the serpentine manner.

In an aspect of the present disclosure, each of the first half 118 and the second half 120 of the cooling jackets 106 may include a first surface 124 and a second surface 126. The first surface 124 may include a plurality of cavities 128 for receiving the energy storage cells 108. The plurality of cavities 128 may have a substantially curved surface to receive the energy storage cells 108. The cavities 128 may be of any shape which is capable of receiving different shapes of the energy storage cells 108. A person skilled in the art may understand that, the first surface 124 of the first half 118 or the second half 120 may include any number of cavities 128 to retain the energy storage cells 108 based on the power requirements of the battery pack 100.

As illustrated in FIG. 2, the second surface 126 may include a plurality of ribs 130 configured to provide structural rigidity to the first half 118 and the second half 120. Further, the ribs 130 may avoid any warping or compression of the energy storage cells 108 provided on the cavities 128 on the first surface 124. Further, as illustrated in the magnified view, the second surface 126 of the second half 120 may include a plurality of weld points 131 integrally on its surface and along a periphery of the second surface 126 configured to be attached with corresponding weld points (not shown) on the second surface 126 of the first half 118. In an aspect of the present disclosure, the weld point 131 attachment of second surfaces of the first half 118 and the second half 120 may be welded by for example, but not limited to, vibration welding. The weld attachment points 131 may include a bead material 133 to fill the weld during attachment of second surfaces of the first half 118 and the second half 120. A person ordinarily skilled in the art may understand that, the first half 118 and the second half 120 may be attached by spot welding, glued, or other mechanical means known in the art without deviating from the scope of the present disclosure.

Figure 3:
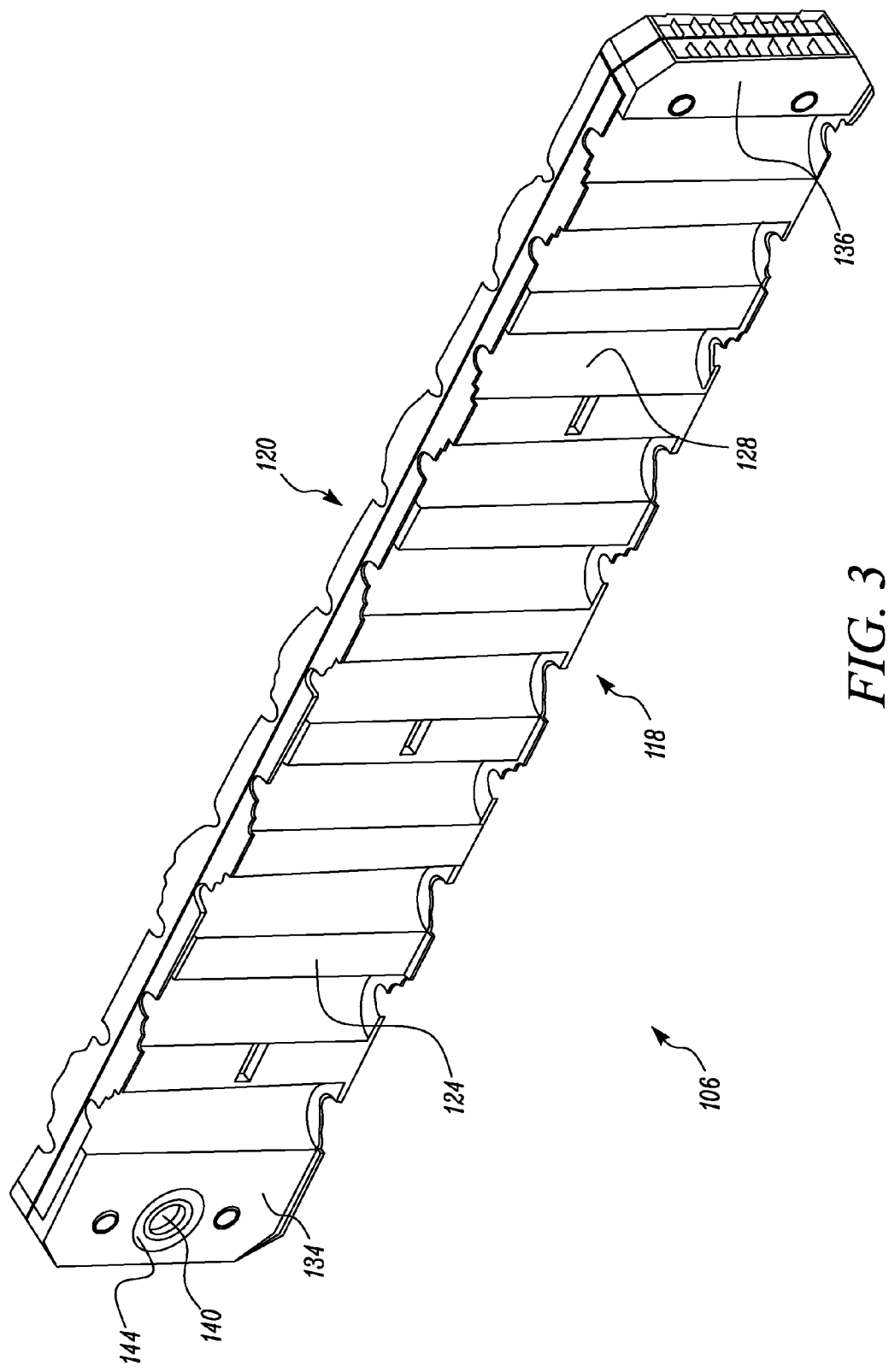
FIG. 3 illustrates an assembled view of the cooling jacket of FIG. 2 according to an aspect of the present disclosure.

The first half 118 and the second half 120 may include aligned openings 132 provided on a first end 134 and a second end 136. Further, the openings 132 provided on the first end 134 and the second end 136 may receive compression fittings 138. The compression fittings 138 are configured to receive the mechanical fittings 110 during assembly of the first half 118 and the second half 120. Further, the first end 134 of the first half 118 and the second half 120 may include a coolant opening 140 having an O-ring interface 142. The coolant opening 140 may allow the flow of the liquid coolant inside the channel 122 defined by the first half 118 and the second half 120. Further an O-ring 144 or a gasket placed into the O-ring interface 142 to allow a leak-proof flow of the liquid coolant from one stack to another. FIG. 3 illustrates an assembled view of the cooling jacket 106 of FIG. 2.

Figure 4:
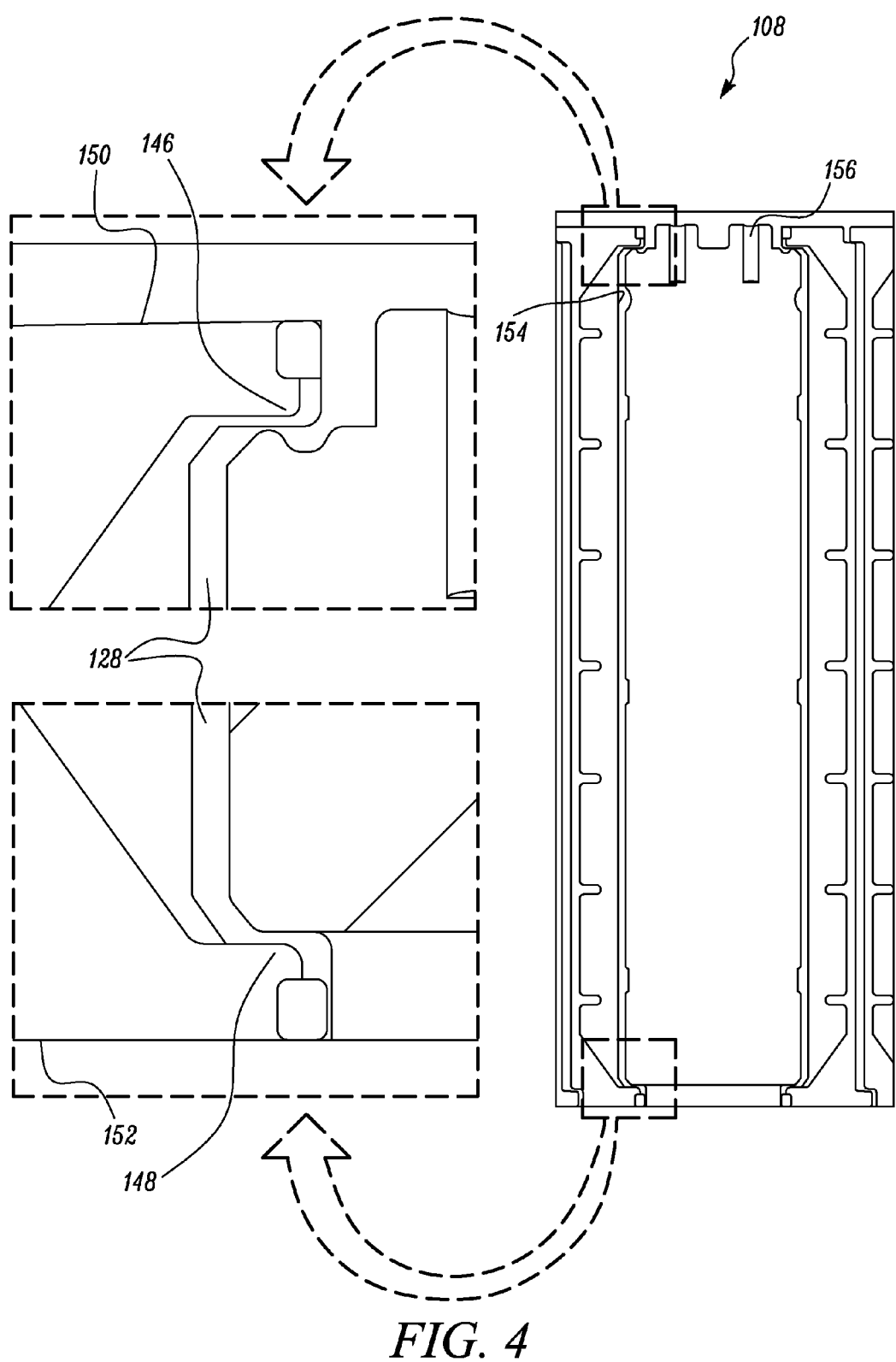
FIG. 4 illustrates a cross-sectional side view of the battery pack of FIG. 1 along a X-Y plane, according to an aspect of the present disclosure.

FIG. 4 illustrates a portion of a cross-sectional side view of FIG. 1 along X-Y plane. As illustrated, the cavity 128 may include a first draft 146 and a second draft 148 provided at a top portion 150 and a bottom portion 152. The first draft 146 and the second draft 148 may be fitted into a space between a sidewall 154 of the cavity 128 and the energy storage cell 108, such that the energy storage cell 108 is not readily loosened from the space, thereby preventing the energy storage cell 108 located at an interior area of the cavity 128. Further, a thermal conductive potting material or a conductive wrap may be filled in the cavity 128 for better heat absorption from the energy storage cells 108. In an aspect of the present disclosure, the first draft 146 and the second draft 148 may secure the energy storage cell 108 by a wedge fit. A person ordinarily skilled in the art may understand that, the energy storage cells 108 may be fitted in the cavity 128 by any means well known in the art, for example, but not limited to, a press fit or a snap fit. Further, the first draft 146 and the second draft 148 provided on the plurality of cavities 128 may retain the energy storage cells 108 to a common plane for mounting the circuit boards and a buss bar (not shown).

INDUSTRIAL APPLICABILITY

The industrial applicability of the battery pack is described herein will be readily appreciated from the foregoing discussion. The battery pack 100 may be operated with any internal combustion engine, such as, but not limited to, diesel engine, gasoline engine or a natural gas engine equipped with transient loads. The battery pack 100 is adapted for use with such as, an electrical vehicle, a hybrid vehicle, an excavator, an articulated truck, a locomotive, an off-site generator. Further, the battery pack 100 may be used in power grid stabilization, for example in solar plants, hydro plants, or nuclear power plants. The battery pack 100 may also be used in the fields of cell towers, and automobiles. In an embodiment of the present disclosure, the cooling jacket 106 for the battery pack 100 provides an efficient heat transfer between the energy storage cells 108 to operate at lower temperatures. Further, the cooling jacket 106 may also provide a structural support for retaining the energy storage cells 108, increasing the overall efficiency of the battery pack 100.

Referring to FIG. 1, the battery pack 100 including the stacked cooling jackets 106 associated with the circuit boards, converters, inverters, controllers, and the cooling system may be enclosed in a single modular housing (not shown). In an aspect of the present disclosure, a single controller may be configured to control the overall operations of the battery pack reducing the overall space of the housing. The single housing enclosing all components may reduce the size and cost of the overall assembly. This compact arrangement including the battery pack 100 and the associated components in the single housing may eliminate a need of high voltage connections. This may cut excess weight and material for packaging of the energy storage cells 108.

In an aspect of the present disclosure, the mechanical fittings 110, for example, the nut and bolt assembly joining the group of stacked cooling jackets 106 in the battery pack 100 may avoid or limit stress on the energy storage cells 108 during compression. The compression fittings 138 may carry load across the mechanical fittings 110, so as to avoid any unwanted stress on the cooling jackets 106 or the energy storage cells 108. The O-ring 144 or the gasket provided on the O-ring interface 142 may create a seal between the channels 122 of the successive cooling jackets 106. Further, the mechanical fittings 110 may provide compression of the O-rings 144 on each end of the channels 122.

Referring to FIG. 2, the ribs 130 provided on the second surface 126 of the cooling jacket 106 may provide structural rigidity to the first half 118 and the second half 120. Further, the ribs 130 may avoid any warping or compression of the energy storage cells 108 provided on the cavities 128 on the first surface 124. The weld points 131 provided on the second surface 126 of the second half 120 may be joined with the vibration welding to the second surface (not shown) of the first half 118. The vibration welding may provide a fast weld cycle providing high strength and a hermetic seal appearance. The cooling jackets are made from a non-filled ABS material and further the vibration welding may create a flash bead and may not break and flow onto the channels 122. The cooling jacket 106 may further include integrated openings provided on the top portion 150 and the bottom portion 152 to receive terminals 156 of the energy storage cells 108 for proper assembly. In an aspect of the present disclosure, a positive terminal and a negative terminal may be provided on the openings provided of the top portion 150, or the positive terminal on the top portion 150 and the negative terminal on the bottom portion 152. Referring to FIG. 4, the wedge fit provided between the first draft 146 and the second draft 148 with the energy storage cell 108 provides a secure retention of the energy storage cells 108. Further, the first draft 146 and the second draft 148 may set the height of all the energy storage cells 108 to a common plane so that the circuit board and the buss bar may be mounted in an optimized manner.

Figure 5:
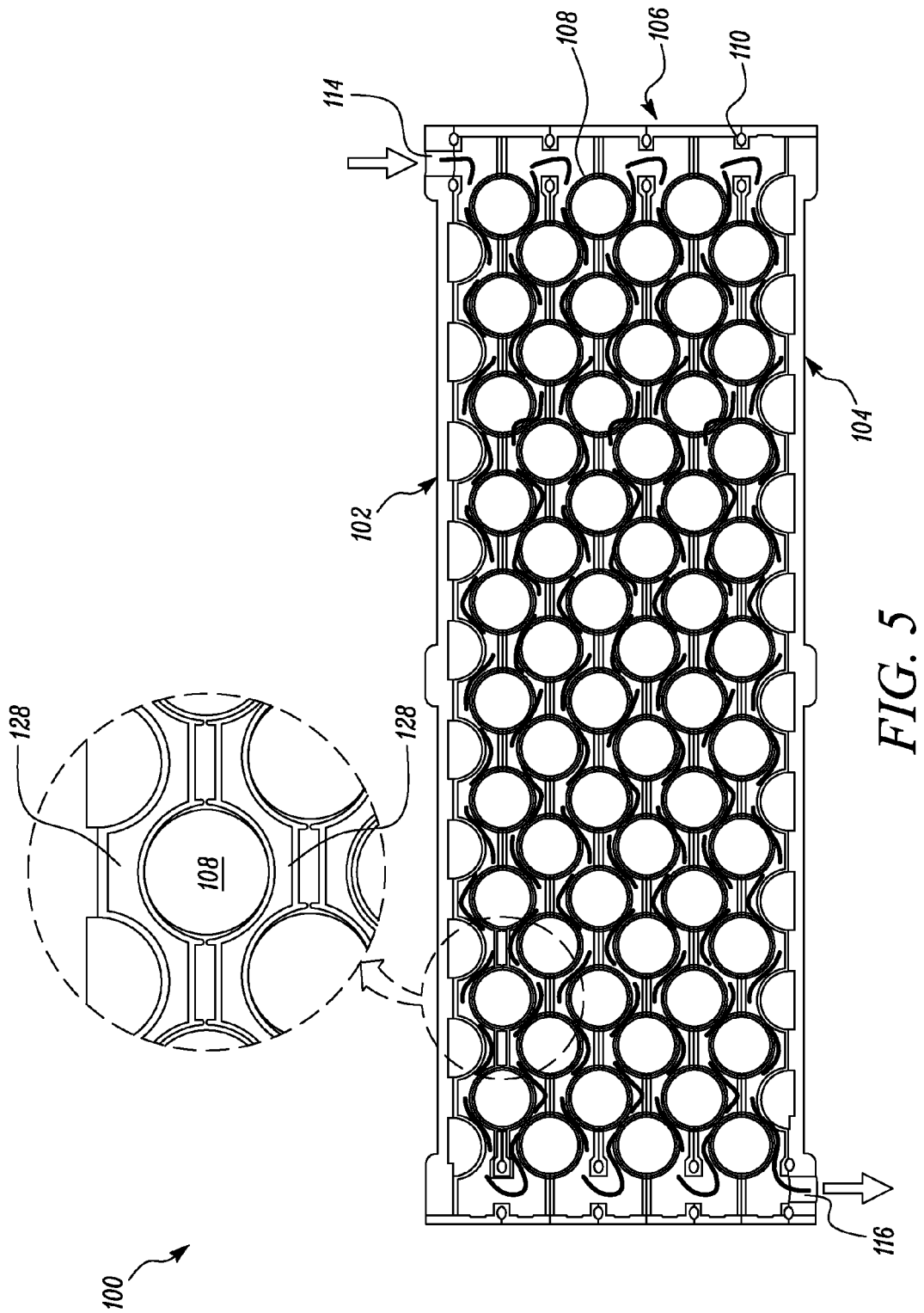
FIG. 5 illustrates a cross-sectional top view of the battery pack along the X-Y plane, illustrating a flow path of a liquid coolant inside the cooling jacket, according to an aspect of the present disclosure.

FIG. 5 illustrates a flow path of the liquid coolant inside the stacked cooling jackets 106, according to an aspect of the present disclosure. The liquid coolant flows through the channels 122 provided in the coolant jacket 106 to cool the energy storage cells 108 for more efficient operation. As depicted by the arrows, the liquid coolant may enter through the inlet opening 114 provided on the first plate 102 of the battery pack 100. The liquid coolant may further flow through the coolant opening 140 provided at the first end 134 of the first half 118 of the cooling jacket 106. The liquid coolant may further flow through the channel 122 provided in between the first half 118 and the second half 120 of the cooling jacket 108. Further, the liquid coolant may exit through the coolant opening 140 provided at the first end 134 of the second half 120 and enters into a second end of a first half of a successive cooling jacket 106 and flows through a channel provided between the first half and a second half of the successive cooling jacket 106.

The liquid coolant may flow through the stacked cooling jackets 106 cooling the energy storage cells 108 provided on the first surfaces 124 of the cooling jackets 106. Further, the liquid coolant may exit through the outlet opening 116 provided in the second plate 104. In an aspect of the present disclosure, the first half 118 and the second half 120 may have an average wall thickness of about 2.5 mm for optimized heat transfer between the energy storage cell 108 and the liquid coolant. The heat transfer between the liquid coolant and the energy storage cells 108 may be a conduction mode or a convection mode. A magnified view of FIG. 5 illustrate a retention area of the energy storage cells 108 between a pair of the cooling jackets 106. The retention areas may not be uniform, for example, an oblong shape, so as to pinch the energy storage cells 108 for appropriate retention. During compression of the energy storage cells 108, the oblong shape of the retention areas may cause the cavities 128 to close to zero for about 35% of the face of the energy storage cell 108. Additionally, the oblong shape of the retention areas assists in compressing the energy storage cell 108 and holding it in place.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A cooling jacket for a battery pack formed by a group of stacked cooling jackets, comprising:
   a first half and a second half, wherein the first half and the second half are substantially identical and flip-ably connected to each other, wherein the flip-ably connected first half and second half are in direct contact with one another;
   a channel provided in between the first half and the second half; and
   a coolant flows in the channel provided between the first half and the second half.

2. The cooling jacket of claim 1, wherein each of the first half and the second half includes a first surface and a second surface.

3. The cooling jacket of claim 2, wherein the first surface includes a plurality of cavities and each cavity capable of receiving an energy storage cell.

4. The cooling jacket of claim 3, wherein the plurality of cavities are non-uniform to pinch the energy storage cells.

5. The cooling jacket of claim 3, wherein the cavities include a first draft and a second draft to secure the energy storage cell with a wedge fit.

6. The cooling jacket of claim 2, wherein the second surface includes a plurality of ribs to prevent crushing or warping of the energy storage cells.

7. The cooling jacket of claim 2, wherein the second surface includes a plurality of integral fastening points.

8. The cooling jacket of claim 7, wherein the plurality of integral fastening points are provided to include one of welding and gluing.

9. The cooling jacket of claim 1 further includes integrated openings to receive the energy storage cell terminals.

10. A battery pack for retaining a plurality of energy storage cells comprising:
   a first plate provided with an inlet opening to allow a coolant;
   a second plate provided with an outlet opening to exit the coolant;
   a group of stacked cooling jackets are provided in between the first plate and the second plate, each of the group of stacked cooling jackets comprising:
      a first half, comprising:
         a first half first end,
         a first half second end disposed opposite the first half first end, and
         a first half coolant opening through the first half proximate the first half first end;
      a second half, comprising:
         a second half first end,
         a second half second end disposed opposite the second half first end, and
         a second half coolant opening through the second half proximate the second half first end, wherein the first half and the second half are substantially identical and flip-ably connected to each other with the first half first end disposed adjacent to the second half second end and the second half first end disposed adjacent to the first half second end, wherein the flip-ably connected first half and second half are in direct contact with one another;

a channel provided in between the first half and the second half to allow fluid flow within the cooling jacket between the first half coolant opening and the second half coolant opening; and the coolant flows in the channel provided between the first half and the second half.

11. The battery pack of claim 10, wherein the plurality of energy storage cells retained in the stacked cooling jackets are set to a common plane to mount a buss bar.

12. The battery pack of claim 10, wherein the cooling jacket includes integrated openings to receive the energy storage cell terminals.

13. The battery pack of claim 10, wherein each of the first half and the second half includes a first surface and a second surface.

14. The battery pack of claim 13, wherein the first surface includes a plurality of cavities to and each cavity capable of receiving an energy storage cell.

15. The battery pack of claim 14, wherein the plurality of cavities are non-uniform to pinch the energy storage cells.

16. The battery pack of claim 14, wherein the cavities include a first draft and a second draft to secure the energy storage cell with a wedge fit.

17. The battery pack of claim 13, wherein the second surface includes a plurality of ribs to prevent crushing or warping of the energy storage cells.

18. The battery pack of claim 10, wherein the group of stacked cooling jackets are arranged side-by-side with the first coolant opening of one of the group of stacked cooling jackets facing and in fluid communication with the second coolant opening of an adjacent one of the group of cooling jackets so that the coolant flows through the group of stacked cooling jackets in a serpentine manner whereby the coolant flows through the channel of the one of the group of stacked cooling jackets from the first coolant opening to the second coolant opening in a first direction and the coolant flows through the channel of the adjacent one of the group of stacked cooling jackets from the first coolant opening to the second coolant opening in a second direction that is opposite the first direction.

19. The battery pack of claim 10, wherein the inlet opening of the first plate is facing and in fluid communication with the first coolant opening of a first end one of the group of cooling jackets.

20. The battery pack of claim 19, wherein the outlet opening of the second plate is facing and in fluid communication with the second coolant opening of a second end one of the group of cooling jackets.

* * * * *